(12) United States Patent
Baseeth et al.

(10) Patent No.: US 8,057,675 B2
(45) Date of Patent: Nov. 15, 2011

(54) METHODS OF REMEDIATION OF WATER

(75) Inventors: Shireen Baseeth, Decatur, IL (US); Paul Bloom, Decatur, IL (US); Bruce Sebree, Oakley, IL (US); Donovan Smith, Parkville, MO (US)

(73) Assignee: JRW Bioremediation, LLC, Lenexa, KS (US)

( * ) Notice: Subject to any disclaimer, the term of this patent is extended or adjusted under 35 U.S.C. 154(b) by 0 days.

(21) Appl. No.: 12/868,396

(22) Filed: Aug. 25, 2010

(65) Prior Publication Data

US 2010/0314312 A1   Dec. 16, 2010

Related U.S. Application Data

(63) Continuation of application No. 12/115,011, filed on May 5, 2008, now Pat. No. 7,785,468.

(60) Provisional application No. 60/916,058, filed on May 4, 2007.

(51) Int. Cl.
*C02F 3/00* (2006.01)

(52) U.S. Cl. .............. 210/610; 210/611; 210/170.03; 210/170.07; 210/170.1

(58) Field of Classification Search .......... 210/610–611, 210/170.03, 170.07, 170.1
See application file for complete search history.

(56) References Cited

U.S. PATENT DOCUMENTS

| | | | | |
|---|---|---|---|---|
| 5,308,759 A * | 5/1994 | Gierhart | ............ | 435/67 |
| 6,039,966 A * | 3/2000 | Kostka et al. | ............ | 424/405 |
| 6,382,133 B1 * | 5/2002 | Gednalske et al. | ............ | 119/174 |
| 7,897,798 B2 * | 3/2011 | McNeff et al. | ............ | 554/170 |

* cited by examiner

*Primary Examiner* — Chester Barry
(74) *Attorney, Agent, or Firm* — Lathrop & Gage LLP

(57) ABSTRACT

Methods for bioremediation of contaminants in water using soapstock, an acid oil of soapstock, a neutralized acid oil of soapstock or combinations thereof are described. Systems for bioremediation are also disclosed.

21 Claims, 12 Drawing Sheets

METHODS OF REMEDIATION OF WATER

CROSS REFERENCE TO RELATED APPLICATIONS

This application is a continuation of prior, U.S. application Ser. No. 12/115,011, filed May 5, 2008, issued as U.S. Pat. No. 7,785,468 on Aug. 31, 2010, which itself claims the benefit under 35 U.S.C. §119(e) of U.S. Provisional Application Ser. No. 60/916,058, filed May 4, 2007, the contents of the entirety of which are incorporated by this reference.

TECHNICAL FIELD

Various non-limiting embodiments of the disclosure are directed toward methods for bioremediation of contaminated sites. Non-limiting embodiments include, but are not limited to, methods that facilitate degradation of certain chemicals by microorganisms.

SUMMARY OF THE INVENTION

In one embodiment, a method comprises placing a composition in contact with water. The composition comprises soapstock, an acid oil of soapstock, a neutralized acid oil of soapstock and any combinations thereof. The composition further comprises a compound selected from the group consisting of an emulsifier, a lactate ester, a lactate polymer, a polyhydric alcohol, carboxylic acids, salts of carboxylic acids, and any combinations thereof.

In a further embodiment, a composition comprises a first component selected from the group consisting of soapstock, acid oil of soapstock, a neutralized acid oil of soapstock and any combinations thereof; and a second component selected from the group consisting of ethoxylated monoglyceride, lecithin, sodium stearoyl lactylate, polylactate, ethyl lactate, a carboxylic acid, a salt of a carboxylic acid and any combinations thereof. Upon placement of 0.2 milliliters of the composition in 100 milliliters of water comprising an amount of contaminant and a mixed culture of halo-respiring bacteria and after a period of time, at least a portion of the amount of contaminant is converted into an innocuous derivative thereof.

In an additional embodiment, a bioremediation composition comprises soapstock, acid oil of soapstock, a neutralized acid oil of soapstock, or any combinations thereof; ethyl lactate, polylactate, sodium stearoyl lactylate or any combinations thereof; and lecithin, ethoxylated monoglyceride or a combination thereof. Upon placement of 0.2 milliliters of the composition in 100 milliliters of water comprising an amount of contaminant and a mixed culture of halo-respiring bacteria and after a period of time, at least a portion of the amount of contaminant is converted into an innocuous derivative thereof.

In yet a further embodiment, a system for introducing a bioremediation composition into a source of water comprises a source of a bioremediation composition comprising soapstock, an acid oil of soapstock, a neutralized acid oil of soapstock and any combinations thereof. The system further includes a source of contaminated water and a conduit configured for placing the bioremediation composition in contact with contaminated water.

DETAILED DESCRIPTION

Figure 1:
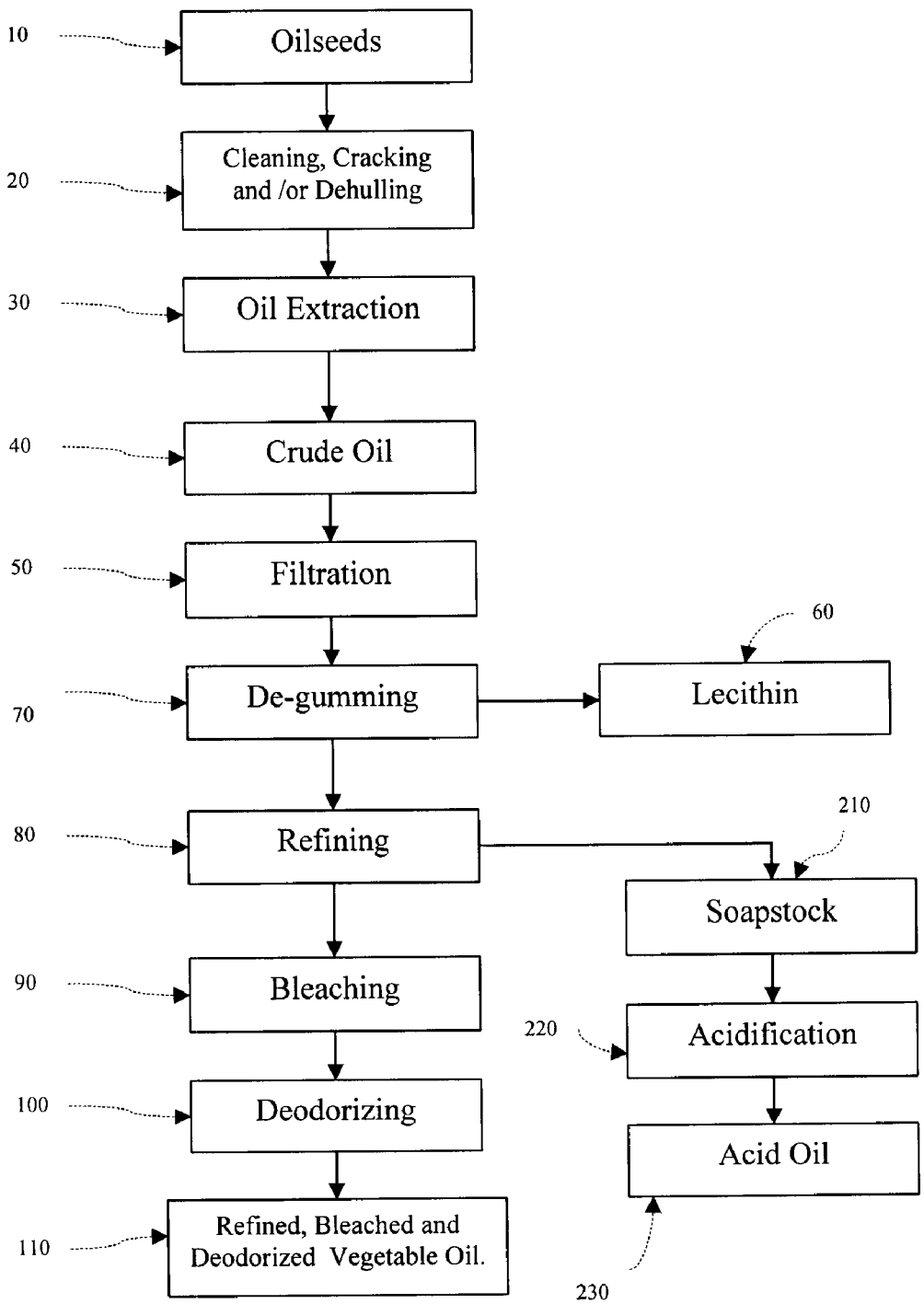
FIG. 1 is a schematic of a process for vegetable oil processing that may be used to produce soapstocks, acid oils or other by-products of vegetable oil refining that may be used in one embodiment of producing bioremediation compositions of the described herein.

This disclosure describes several different features and has aspects of, and with reference to various exemplary, non-limiting embodiments. It is understood, however, that the disclosure embraces numerous exemplary embodiments, which may be accomplished by combining any of the different features, aspects, and embodiments described herein in any combination that one of ordinary skill in the art would find useful.

Chlorinated solvents are the most common class of ground water contaminants found at hazardous waste sites in the United States. In a list of the top 25 most frequently detected contaminants at such sites, the Agency for Toxic Substances and Disease Registry (ATSDR) found that ten of the top twenty contaminants were chlorinated solvents or their degradation products. National Research Council, Alternatives for Ground Water Cleanup (National Academy Press, Washington, D.C. 1994). The same survey found that a common contaminant, trichloroethylene (TCE), is present at more than 40% of the National Priority List sites. Remediation of ground water contaminated by these compounds presents unique obstacles related to their inherent characteristics, including hydrophobicity and high density. Recent advances in the understanding of biodegradation processes involving chlorinated solvents permit remediation of residual contamination source areas in low permeability, saturated or variably saturated soils at a much lower cost than conventional methods.

Metals, perchlorates, explosives, and other contaminants also appear on lists of contaminants frequently detected at hazardous waste sites. These contaminants present challenges to cleaning up such sites. In the reductive dechlorination process, chloroethenes act as electron acceptors. This implies that the process can be limited in the field by the availability of sufficient, suitable electron donors. Reductive dechlorination also can be totally or partially inhibited by the presence of competing inorganic electron acceptors such as oxygen, nitrate, iron, and sulfate. It is widely accepted that reductive dechlorination occurs to some extent at most field sites where chloroethene contamination exists in the presence of a sufficient supply of electron donors.

Interest has grown in using slow release electron donors in enhanced bioremediation (also referred to as bioaugmentation) systems for treating chlorinated solvents and other contaminants in groundwater. Slow release electron donors keep hydrogen levels low enough such that dechlorinating bacteria may use a greater percentage of the bioremediation composition than with the more readily available electron donors. If hydrogen levels become too high, methanogens may dominate the system. This interest in slow release electron donors is derived from the simplicity and low maintenance requirements of slow release systems relative to conventional systems that use continuous or semi-continuous addition of soluble electron donors, such as lactate or molasses. The costs of the electron donor may be a significant fraction of total process costs for slow release systems, making the selection of an efficient and low cost electron donor important to the efficacy and overall economics of these systems. Many oxidizable, organic compounds may be suitable electron donors. For a potential electron donor to be useful as a composition for bioremediation, it should be safe to use, facilitate the desired reaction, and be relatively inexpensive.

Carbon substrates may be used as electron donors to enhance reductive degradation of halogenated solvents, perchlorate and certain metals. Emulsified vegetable oil has been used as a carbon source for enhanced halorespiration. Different types of vegetable oils can be used in these applications, including, but not limited to, soy bean oil, sunflower, rapeseed, sesame, olive, canola, mustard and corn oil. These edible oils may include mixed glycerides. Some formulations of vegetable oil substrates are slowly degraded and may remain in the aquifer years beyond what is required, while others cannot be readily distributed in the aquifer matrix. Vegetable oil alone may not be utilized fast enough to support the strongly reducing conditions required for complete dehalogenation of solvents. In order to overcome the slow degradation rates inherent in these vegetable oil systems, sodium lactate is added to stimulate reducing conditions and build up the biomass. Problems with clogging of the aquifer may be overcome by adding emulsifying agents to lower the viscosity of the system and allow greater sub-surface dispersion.

In one embodiment, a low cost, high efficiency method for carrying out bioremediation of hazardous waste sites, contaminated ground water sources, and/or superfund sites is disclosed. In other embodiments, methods of using certain compositions as electron donors for bioremediation are disclosed.

In other embodiments, methods and compositions for cleaning up metals, perchlorates, explosives, and other contaminants that appear on lists of contaminants detected at hazardous waste sites are disclosed.

In one embodiment, a method comprises placing a composition in contact with water. After a period of time, if the water comprises a contaminant, the presence of the composition in the water results in the contaminant being converted into an innocuous derivative thereof.

In another embodiment, a method comprises placing a composition comprising soapstock, acid oil or a combination thereof and a compound selected from the group consisting of an emulsifier, a lactate ester, a lactate polymer, a polyhydric alcohol, carboxylic acids, salts of carboxylic acids, and any combinations thereof in contact with water. After a period of time and if the water comprises a contaminant, the presence of the composition in the water results in the contaminant being converted into an innocuous derivative thereof.

In yet a further embodiment, a composition comprises: soapstock; ethyl lactate, sodium stearoyl lactylate, polylactate, or a combination thereof; and lecithin.

In a further embodiment, a composition consists essentially of: soapstock; ethyl lactate, sodium stearoyl lactylate, polylactate, or a combination thereof; and lecithin.

In another embodiment, a composition comprises: lecithin; ethoxylated monoglycerides; soap stock, acid oil, neutralized acid oil, or any combinations thereof; and ethyl lactate.

In still another embodiment, a composition comprises lecithin; a compound having at least 20% fatty acids; ethoxylated monoglycerides; and ethyl lactate.

In a further embodiment, a composition comprises: a first component selected from the group consisting of soapstock, acid oil of soapstock, a neutralized acid oil of soapstock, and any combinations thereof; ethyl lactate; and a second component selected from the group consisting of ethoxylated monoglyceride, lecithin, sodium stearoyl lactylate, polylactate, carboxylic acid, salt of a carboxylic acid, and any combinations thereof.

In an additional embodiment, a composition consists essentially of: soapstock, acid oil of soapstock, a neutralized acid oil of soapstock, and any combinations thereof; and a compound selected from the group consisting of ethyl lactate, polylactate, ethoxylated monoglyceride, lecithin, sodium stearoyl lactylate, carboxylic acids, salts of carboxylic acids, and any combinations thereof.

Methods of using the compositions described herein for bioremediation and systems employing the compositions of described herein for bioremediation are further disclosed. In a yet another embodiment, methods and compositions are described for replacing the use of expensive vegetable oils in bioremediation. In a yet another embodiment, novel compositions for bioremediation based on vegetable oil soap stocks are described.

In other embodiments, an emulsified soap stock system may function as an electron donor for reductive degradation of contaminants in ground water, waste water, waste cleanup locations, and/or other contaminated sites. In another embodiment, the composition that may function as the electron donor may include, but is not limited to, vegetable oil refining by-products, crude oil/partially refined vegetable oils, refining by-product/by- or co-products of vegetable oil refining, acid oil or neutralized acid oils, salts and esters of organic acids and the like.

In one embodiment "soapstock byproduct" or "soapstock" may include a byproduct that is filtered from a crude or partially refined vegetable oil during the manufacture of a refined vegetable oil. The soapstock may contain about 30% to 40% fatty acid, with the remainder of the soapstock being water, lecithin, gums, glycolipids or other compounds. Soapstock may be an alkaline emulsion comprising water, acylglycerols, phosphoacylglycerols, and free fatty acids.

The raw soapstock may be acidified, as by sulfuric acid treatment of the soapstock, so as to cause the soapstock to separate into three layers including a top layer of fatty acids, an interface byproduct or middle layer called "skimmings", and a bottom layer of acidic water. The three layers are visible to the naked eye and are each pumped off in sequence from the separated treated soapstock. The fatty acids from the top layer of the separated, treated soapstock have long been considered a product of the acidification treatment of the soapstock (acid oil), and these fatty acids from the top layer of the separated treated soapstock may be used in agricultural feed products. The "acid oil" neutralized with sodium hydroxide may be referred to as "neutralized acid oil" which contains sodium salts of free fatty acids and other compounds.

In yet another embodiment, a composition comprising a compound that may function as an electron donor is intermixed with a surfactant, a polyhydric alcohol, lecithin and/or a water soluble polymer. In certain embodiments, the surfactant may comprise a compound including, but not limited to, fatty amine oxides; quaternary ammonium compounds; betaines; sugar-derived surfactants; alkyl polyglycosides; polysorbate; polyglycerol esters; fatty alcohol ethoxylates; fatty alkanolamide; polyglycol ethers; block copolymers; vegetable oil ethoxylates; fatty acid ethoxylates; alpha olefin sulfonate; sodium lauryl sulfates; sarcosinates; sulfosuccinates; isethionates; ether sulfates; and combinations of any thereof.

In certain other embodiments, the polyhydric alcohol may include, without limitation, methanol, ethanol, n-propanol, isopropanol, ethylene glycol, propylene glycol, glycerol, and combinations of any thereof.

In other embodiments, the lecithin may include, without limitation, crude lecithin, de-oiled lecithin, fluid lecithin, chemically modified lecithin, enzymatically modified lecithin, lecithin blends with high HLB emulsifiers or combinations of any thereof. In one embodiment, the chemically modified lecithin may be an acetylated and hydroxylated lecithin such as Thermolec WFC brand lecithin available from Archer-Daniels-Midland Company of Decatur, Ill.

In certain other embodiments, the emulsifier may be include, but not be limited to, lecithins, chemically modified lecithins, enzymatically modified lecithins, sodium stearoyl lactylates, steroyl lactylic acid, sodium oleyl lactates, oleyl lactilic acid, mono- and di-glycerides, ethoxylated mono and di-glycerides, fatty amine oxides, quaternary ammonium surfactants such as bile salts, betaines, sugar-derived surfactants, alkyl polyglycosides, polysorbates, polyglycerol esters, fatty alcohol ethoxylates, fatty alkanolamides, polyglycol ethers, block copolymers, vegetable oil ethoxylates, fatty acid ethoxylates, alpha olefin sulfonates, sodium lauryl sulfates, sarcosinates, sulfosuccinates, isothionates, ether sulfates, or combinations of any thereof.

In another embodiment, the compound may function as the electron donor and may be one or more of the compounds including, but not limited to, lactic acid, formic acid, whey, propylene glycol, glucose, fructose, sorbitol, vegetable oil, zero valent iron, molecular hydrogen, ethylene glycol, acetic acid, propionic acid, succinic acid, gluconic acid, butyric acid, capyric acid, modified vegetable oil, diglycerides, glycerol, lactate esters, polylactates, ethanol, methanol, corn syrup, molasses, soap stock, acid oil, emulsified soap stock, carboxylic acids, salts of carboxylic acids, and combinations of any thereof.

In one embodiment, soybean soap stock may be used. Soybean soap stock is an inexpensive byproduct that may be obtained from a caustic refining process of crude vegetable oil such as the process described in FIG. 1. The soapstock may contain 20-30% of sodium salts of fatty acids, 15-25% oil and about 50-60% water in addition to small amounts of phospholipids, glycolipids or gums.

Various non-limiting embodiments of this disclosure may include, without limitation, the use of various formulations of emulsifiable substrates including, but not limited to, those containing soap stock as the slow release electron (or hydrogen) donors for the dehalogenation of solvent contaminated groundwater. Some soap stock-based formulations may be mixed with ethyl lactate and emulsifiers, thus, forming emulsifiable oil substrates (EMO). These formulations may be added to a contaminated environment to facilitate the bioremediation of the contaminants present within the contaminated environment.

In other non-limiting embodiments, the emulsifiable oil substrate may be intermixed with one or more of a component including, but not limited to, an emulsifier, an electron donor, a polyhydric alcohol, lecithin, and any combinations thereof. In yet other embodiments, monoglycerides or modified monoglycerides may also be added. The emulsifiable oil substrate may include, without limitation, monoglycerides, diglycerides, triglycerides, free fatty acids, and combinations of any thereof.

In yet other embodiments, the compositions described herein may be applied to contaminated waste water sites using a variety of techniques available to those or ordinary skill in the art. In some embodiments, a concentrate of oil in water emulsifiable moderate viscosity emulsion may be produced while in other embodiments, oil in water emulsion may be produced. The concentrate or oil in water emulsion may be diluted to 0.5 to 50% organic concentration, thus, forming a low viscosity water emulsion that may be injected into a subsurface by means of direct push injection, pressure injection into a well or gravity fed into a well.

In other embodiments, it may be advantageous to inject the concentrate or oil in water emulsion as is, that is without dilution. In the case of the concentrate, a permeable reactive barrier (PRB) may be formed by injecting the concentrate without any water dilution. This slightly viscous liquid will not move very far from the injection point, will emulsify and move down gradient slowly as the groundwater moves past the edges of the slightly viscous liquid. In the case of the emulsion, the emulsion may be injected at delivered concentrations in the case where the soil can only take small volumes of liquid or where broad distribution of organics is not required. In situations where there are few injection points and large lateral distribution is necessary, the concentrate or the oil in water emulsion may be diluted to below 5% organics. The concentrate or the oil in water emulsion may be diluted by mixing with the appropriate amount of water and applying low to moderate shear.

One embodiment of a dilution system may be to meter the concentrate or oil in water emulsion and water into a mixing tee at the appropriate ratio. The tee may be an in line mixer. In some embodiments, with the appropriate turbulence in the tee, an in line mixer may not be necessary. Another embodiment of this disclosure would be to apply shear in a mix tank using agitation or air jet.

Once emulsified at a suitable injection concentration, the water emulsions may be injected at a wide range of pressures, limited only by the ratings of the equipment.

In other embodiments, a composition comprising soap stock; lecithin; a compound selected from the group consisting of ethyl lactate, sodium stearoyl lactylate, polylactate, and combinations of any thereof, and a compound selected from the group consisting of triglycerides, diglycerides, sugar alcohols, ethoxylated monoglycerides, fatty acid ethoxylates, sorbitan monoester, polyoxyethylene alkyl ethers, polyoxyethylene alkyl esters, sorbitan alkyl esters, polyoxyethylene sorbitan alkyl esters, glycerol esters, short chain fatty alcohols, acids, esters, glycerols, glycols, derivatives of any thereof, and combinations of any thereof is disclosed.

In another embodiment, a composition comprises soap stock; lecithin; a compound selected from the group consisting of ethyl lactate, sodium stearoyl lactylate, polylactate, and any combination thereof, and a compound selected from the group comprising sorbitan monostearate, polyoxyethylene ester of rosin, polyoxyethylene dodecyl mono ether, polyoxyethylene-polyoxypropylene block copolymer, polyoxyethylene monolaurate, polyoxyethylene monohexadecyl ether, polyoxyethylene monooleate, polyoxyethylene mono(cis-9-octadecenyl)ether, polyoxyethylene monostearate, polyoxyethylene monooctadecyl ether, polyoxyethylene dioleate, polyoxyethylene distearate, polyoxyethylene sorbitan monolaurate polyoxyethylene sorbitan monooleate, polyoxyethylene sorbitan monopalmitate, polyoxyethylene sorbitan monostearate, polyoxyethylene sorbitan trioleate, polyoxyethylene sorbitan tristearate, polyglycerol ester of oleic acid, polyoxyethylene sorbitol hexastearate, polyoxyethylene monotetradecyl ether, polyoxyethylene sorbitol hexaoleate, fatty acids, tall-oil, hexaester with sorbitol, ethoxylated castor oil, ethoxylated soybean oil, ethoxylated polyoxyethylene sorbitol tetraoleate, fatty acids, tall-oil, mixed esters with glycerol and polyethylene glycol, alcohols, C9-16 and ethoxylated derivatives of any thereof, and combinations of any thereof.

In another embodiment, a surfactant used in the various compositions may have a hydrophile-lipophile balance (HLB) between about 8.0 and about 30.0.

In another embodiment, a system comprising a conduit to convey a composition of the present invention to contaminated water or a conduit to convey contaminated water to a composition of the present invention, a zone where the contaminated water and a composition of the present invention mix. The conduit may be a direct push rod connected to a pump to inject a composition of the present invention under pressure, a well that is gravity fed or attached to a pump and feed under pressure, a tube or injection port on a hand held kit, or piping used in laboratory testing equipment. The mixing zone may be followed by a reaction zone where a composition of the present invention facilitates the bioremediation of a contaminant.

In additional embodiments, the system may also include an extraction zone where a conduit removes liquid from the reaction zone and recirculates the liquid to equipment where a composition of the present invention may be added to the extracted liquid before being re-injected into the injection zone. The extracted liquid may contain residual composition, contaminants, remediated water or mixtures thereof.

In certain embodiments, a microorganism capable of bioremediation may be placed in combination with a composition of the present invention and the contaminant. In one aspect, the contaminant is converted into an innocuous derivative. Such compositions may be referred to as bioaugmentative.

In other embodiments, a buffer may be added to a composition of the present invention. In some instances, it may be desired or necessary to help control the pH where a bioremediation microorganism is present. In such instances, it may be necessary to control the pH within the tolerance range for the bioremediation microorganism in order to have an impact on the microbial growth and survival.

In one embodiment, a composition of the present invention may be used in an environment that lowers the pH of the composition. In such instance, a buffer may be used to control the pH of the composition of the present invention in such an environment. This may be done by using an alkaline buffer. An alkaline buffer is a substance with a pH of over 7.0 that has been added to a material to neutralize harmful acids or to act as an alkaline reserve for the purpose of counteracting acids that may form in the future. Buffers that may be used include, but are not limited to sodium, potassium, magnesium or calcium carbonate, acetate or citrate.

The use of a buffered composition of the present invention may have utility in certain situations. For instance, bioremediation is often performed with an electron donor (biostimulation) to achieve geochemical conditions in groundwater that favor the growth of the dechlorinating microorganisms in the bioaugmentation culture. Sometimes, this biostimulation may be subject to extreme environmental conditions, such as high concentrations of chloroform, which may lead to inhibition of reductive dechlorination. Thus, it may be desired to control key environmental factors (like the pH, the organic concentrations and electron acceptors) before, during and after injections of a bioremediation composition in order to provide an environment where the added organism has the most ideal situation for survival. For example, a pH of greater than 6 may lower the ionization of the mineral grains and coatings, and can inhibit the transportation of the bioremediation composition through the environment.

In yet an additional non-limiting embodiment, a composition of the present invention may be produced at a first geographic location and transported or shipped to a second geographic location. For instance, a facility at the first geographic location may be able to produce a product more economically than a facility at the second location due to various factors. The factors may include, for example, lower costs of materials, lower costs of energy (e.g., electricity and/or natural gas or other petroleum products), lower costs of labor (e.g., wages paid to employees), lower costs of environmental controls or effects, or any other requirement for production of the compositions. Thus, the costs of producing the products in the first geographic location may be less than the costs of producing the products in the second geographic location, resulting in the production costs being less in the first geographic location.

In such an instance, the compositions may be produced at the first geographic location and shipped to the second geographic location such as by transport over water with ships or barges, trucking, flying, by rail, or other means of transportation. The geographic location may be a county, a state, a country, a continent, and/or combinations of any thereof. In this manner the product may be produced, for example, in a first county, state, country, or continent, and transported to and/or sold in a second county, state, country, or continent.

In another embodiment, a container or container system may comprise a water soluble (or water dispersible) substance. Each water soluble container may contain a composition of the present invention that does not substantially dissolve the bag, or bags, which it contacts. In such cases, two compositions of the present invention may be stored in the inner and outer bag, respectively, which need not be mixed until the time of application. Such a bag system enables the ease of application of the compositions described herein to managers of waste sites, contaminated ground water locations, water treatment plants, and other suitable sources of water.

Suitable water soluble substances used for the manufacture of such bags or containers may comprise polyethylene oxide, such as polyethylene glycol; starch and modified starch; alkyl and hydroxyalkylcellulose, such as hydroxymethylcellulose, hydroxyethylcellulose, hydroxypropyl cellulose; carboxymethylcellulose; polyvinylethers such as poly methyl vinylether or poly(2-methoxyethoxyethylene); poly(2,4-dimethyl-6-triazinylethylene; poly(3-morpholinyl ethylene); poly(N-1,2,4-triazolylethylene); poly(vinylsulfonic acid);

polyanhydrides; low molecular weight melamine-formaldehyde resins; low molecular weight urea-formaldehyde resins; poly(2-hydroxyethyl methacrylate); polyacrylic acid and its homologs, and combinations of any thereof. The water-soluble polymer films used in this disclosure may be of any suitable film-forming material such as polyvinyl alcohol, methyl cellulose, poly (hydroxyalkanoate) (PHA), poly(lactate) (PLA), polymethylene oxide, sodium carboxy methyl cellulose, polyvinyl pyrrolidone or polyacrylamide selected in the film thickness used and particular form of packaging to for polymer film that is both sufficiently tough and flexible to withstand fabrication, filling, and handling. Bags and packages of such type are described in U.S. Pat. Nos. 5,558,228 and 5,323,906, which are incorporated herein by reference in their entirety.

In one embodiment, a composition of the present invention may be in the form of a microemulsion. In this embodiment, the microemulsion may be characterized as clear, stable, isotropic liquid mixture of oil, an aqueous phase and surfactant, possibly in combination with a cosurfactant. In other embodiments the aqueous phase may contain salt(s) and/or other ingredients, and the "oil" phase may include a mixture of hydrocarbons and olefins. The microemulsions described herein form upon simple mixing of the components and may not require the high shear conditions generally used in the formation of ordinary emulsions. In another embodiment, the microemulsions of the present invention may be referred to as transparent emulsions/dispersions or swollen micelles with particles<100 nm (0.1 µm) in size, whereas an ordinary emulsion may be opaque with particles>400 nm (0.4 µm) and may be easily visible under a microscope.

The various embodiments of this disclosure are further explained by use of the following illustrative examples.

EXAMPLES

Example 1

This embodiment described one method of preparing a bioremediation composition of the present invention using soy soapstock.

A microemulsion composition was prepared by mixing: soy soapstock (available from Archer-Daniels-Midland-Company, Decatur Ill.) in an amount of 38% by weight; ethyl lactate (available from Archer-Daniels-Midland Company, Decatur Ill.) in an amount of 45% by weight; ethoxylated monoglyceride (available from BASF, Florham Park, N.J.) in an amount of 12% by weight; and lecithin (Thermolec WFC, a chemically modified lecithin available from Archer-Daniels-Midland-Company, Decatur Ill.) in an amount of 5% by weight.

The compounds were mixed and homogenized under high shear mixing for between 30 minutes to 60 minutes at ambient temperature. The microemulsion was poured into a 250 ml graduated cylinder and observed for any separation. The microemulsions were stable over one month at room temperature. The particle size distribution and photo micrographs showed a tight distribution of particle size.

Example 2

This embodiment describes a method of preparing a bioremediation composition using soy soap stock.

A microemulsion composition was prepared by mixing: soy soapstock (available from Archer-Daniels-Midland Company, Decatur Ill.) in an amount of 32% by weight; ethyl lactate (available from Archer-Daniels-Midland Company, Decatur Ill.) in an amount of 44% by weight; ethoxylated monoglyceride (available from BASF, Florham Park, N.J.) in an amount of 15% by weight; lecithin (Thermolec WFC, a chemically modified lecithin available from Archer-Daniels-Midland Company, Decatur Ill.) in an amount of 5% by weight; and polylactate in an amount of 4% by weight.

The components were mixed and homogenized under high shear mixing for between 30 minutes and 60 minutes at ambient temperature. The microemulsion was poured into a 250 ml graduated cylinder and observed for any separation. The microemulsions were stable over one month at room temperature. The particle size distribution and photo micrographs showed a tight distribution of particle size.

Example 3

This embodiment describes a method of preparing a bioremediation composition using soy soap stock.

A microemulsion concentrate was prepared by mixing: soy soapstock (available from Archer-Daniels-Midland Company, Decatur Ill.) in an amount of 38% by weight; crude glycerol (available from Archer-Daniels-Midland Company, Decatur Ill.) in an amount of 20% of total soapstock weight; ethyl lactate (available from Archer-Daniels-Midland Company, Decatur Ill.) in an amount of 45% by weight; ethoxylated monoglyceride (available from BASF, Florham Park, N.J.) in an amount of 12% by weight; and lecithin (Thermolec WFC, a chemically modified lecithin available from Archer-Daniels-Midland Company, Decatur Ill.) in an amount of 5% by weight.

The components were mixed and homogenized under high shear mixing for between 30 minutes and 60 minutes at ambient temperature. The microemulsion was poured into a 250 ml graduated cylinder and observed for any separation. The microemulsion was stable over one month at room temperature. The particle size distribution and photo micrographs showed a tight distribution of particle size.

Example 4

This embodiment describes a method of preparing a bioremediation composition using soy soap stock.

A microemulsion composition was prepared by mixing: soy soapstock (available from Archer-Daniels-Midland Company, Decatur Ill.) in an amount of 32% by weight; crude glycerol (available from Archer-Daniels-Midland Company, Decatur Ill.) in an amount of 20% of total soapstock weight; ethyl lactate (available from Archer-Daniels-Midland Company, Decatur Ill.) in an amount of 44% by weight; polylactate produced as described in Example 3, in an amount of 4% by weight; ethoxylated monoglyceride (available from BASF, Florham Park, N.J.) in an amount of 15% by weight; and lecithin (Thermolec WFC, a chemically modified lecithin available from Archer-Daniels-Midland Company, Decatur Ill.) in an amount of 5% by weight.

The components were mixed and homogenized under high shear mixing for between 30 minutes to 60 minutes. The microemulsion was poured into a 250 ml graduated cylinder and observed for any separation. The microemulsion was stable over one month at room temperature. The particle size distribution and photo micrographs showed tight distribution of particle size.

Example 5

This embodiment describes a method of preparing a bioremediation composition using soy soap stock.

A microemulsion composition was prepared by mixing: acid oil of soy soapstock (available from Archer-Daniels-Midland Company, Decatur Ill.) in an amount of 46% by weight; ethyl lactate (available from Archer-Daniels-Midland Company, Decatur Ill.) in an amount of 34% by weight; ethoxylated monoglyceride (available from BASF, Florham Park, N.J.) in an amount of 10% by weight; and sodium stearoyl lactylate in an amount of 10% by weight.

The components were mixed and homogenized under high shear mixing for between 30 minutes to 60 minutes at ambient temperature. The microemulsion was poured into a 250 ml graduated cylinder and observed for any separation. The emulsion was stable over one month at room temperature. The particle size distribution and photo micrographs showed a tight distribution of particle size.

Example 6

This embodiment describes a method of preparing a bioremediation composition using soy soap stock.

A microemulsion composition was prepared by mixing: neutralized acid oil (available from Archer-Daniels-Midland Company, Decatur Ill.) in an amount of 42% by weight; crude glycerol (available from Archer-Daniels-Midland Company, Decatur Ill.) in an amount of 20% of total neutralized acid oil weight; ethyl lactate (available from Archer-Daniels-Midland Company, Decatur Ill.) in an amount of 38% by weight; ethoxylated monoglyceride (available from BASF, Florham Park, N.J.) in an amount of 15% by weight; and lecithin (Thermolec WFC, a chemically modified lecithin available from Archer-Daniels-Midland Company, Decatur Ill.) in an amount of 5% by weight.

The acid oil was neutralized by adding sodium hydroxide, thus bringing the pH (originally 10.0) close to that of the normal soap stock obtained after crude oil processing.

The components were mixed and homogenized under high shear mixing for between 30 minutes to 60 minutes at ambient temperature. The microemulsion was poured into a 250 ml graduated cylinder and observed for any separation. The microemulsion was stable over one month at room temperature. The particle size distribution and photo micrographs showed a tight distribution of particle size.

Example 7

This embodiment describes a method of preparing a bioremediation composition using soy soap stock.

A microemulsion composition was prepared by mixing: neutralized acid oil (available from Archer-Daniels-Midland Company, Decatur Ill.) in an amount of 32% by weight; crude glycerol (available from Archer-Daniels-Midland Company, Decatur Ill.) in an amount of 20% of total neutralized acid oil weight; ethyl lactate (available from Archer-Daniels-Midland Company, Decatur Ill.) in an amount of 44% by weight; polylactate produced as described in Example 3, in amount of 4% by weight; ethoxylated monoglyceride (available from BASF, Florham Park, N.J.) in an amount of 15% by weight; and lecithin (Thermolec WFC, a chemically modified lecithin available from Archer-Daniels-Midland Company, Decatur Ill.) in an amount of 5% by weight.

The components were mixed and homogenized under high shear mixing for between 30 minutes to 60 minutes at ambient temperature. The microemulsion was poured into a 250 ml graduated cylinder and observed for any separation. The microemulsion was stable over one month at room temperature. The particle size distribution and photo micrographs showed a tight distribution of particle size.

Example 8

This embodiment describes a method of preparing a bioremediation composition using soy soap stock.

A microemulsion composition was prepared by mixing: neutralized acid oil (available from Archer-Daniels-Midland Company, Decatur Ill.) in an amount of 42% by weight; crude glycerol (available from Archer-Daniels-Midland Company, Decatur Ill.) in an amount of 20% of total neutralized acid oil weight; ethyl lactate (available from Archer-Daniels-Midland Company, Decatur Ill.) in an amount of 38% by weight; ethoxylated monoglyceride in an amount of 15% by weight; and lecithin (Thermolec WFC, a chemically modified lecithin available from Archer-Daniels-Midland Company, Decatur Ill.) in an amount of 5% by weight.

The acid oil was neutralized by adding sodium hydroxide bringing the pH (originally 10.0) close to that of the normal soap stock obtained after crude oil processing.

The components were mixed and homogenized under high shear mixing for between 30 minutes to 60 minutes. The microemulsion was poured into a 250 ml graduated cylinder and observed for any separation. The microemulsion was stable over one month time at room temperature. The particle size distribution and photo micrographs showed tight distribution of particle size.

Example 9 microemulsion composition was prepared by mixing: soy soapstock (available from Archer-Daniels-Midland Company, Decatur Ill.) in an amount of 60% by weight; ethyl lactate (available from Archer-Daniels-Midland Company, Decatur Ill.) in an amount of 20% by weight; ethoxylated monoglyceride (available from BASF, Florham Park, N.J.) in an amount of 15% by weight; lecithin (Thermolec WFC, a chemically modified lecithin available from Archer-Daniels-Midland Company, Decatur Ill.) in an amount of 5% by weight.

The components were mixed and homogenized under high shear mixing for between 30 minutes and 60 minutes at ambient temperature. The microemulsion was poured into a 250 ml graduated cylinder and observed for any separation. The microemulsions were very stable over one month at room temperature. The particle size distribution and photo micrographs showed a tight distribution of particle size.

Example 10

A microemulsion composition was prepared by mixing: soy soapstock (available from Archer-Daniels-Midland Company, Decatur Ill.) in an amount of 70% by weight; ethyl lactate (available from Archer-Daniels-Midland Company, Decatur Ill.) in an amount of 10% by weight; ethoxylated monoglyceride (available from BASF, Florham Park, N.J.) in an amount of 15% by weight; lecithin (Thermolec WFC, a chemically modified lecithin available from Archer-Daniels-Midland Company, Decatur Ill.) in an amount of 5% by weight.

The components were mixed and homogenized under high shear mixing for between 30 minutes and 60 minutes at ambient temperature. The microemulsion was poured into a 250 ml graduated cylinder and observed for any separation. The microemulsions were very stable over one month at room temperature. The particle size distribution and photo micrographs showed a tight distribution of particle size.

Example 11

A microemulsion composition was prepared by mixing: soy soapstock (available from Archer-Daniels-Midland Company, Decatur Ill.) in an amount of 50% by weight; crude filtered soybean oil (available from Archer-Daniels-Midland Company, Decatur Ill.) in an amount of 10% by weight; ethyl lactate (available from Archer-Daniels-Midland Company, Decatur Ill.) in an amount of 20% by weight; ethoxylated monoglyceride (available from BASF, Florham Park, N.J.) in an amount of 15% by weight; lecithin (Thermolec WFC, a chemically modified lecithin available from Archer-Daniels-Midland Company, Decatur Ill.) in an amount of 5% by weight.

The components were mixed and homogenized under high shear mixing for between 30 minutes and 60 minutes at ambient temperature. The microemulsion was poured into a 250 ml graduated cylinder and observed for any separation. The microemulsions were very stable over one month at room temperature. The particle size distribution and photo micrographs showed a tight distribution of particle size.

Example 12

A microemulsion composition was prepared by mixing: soy soapstock (available from Archer-Daniels-Midland Company, Decatur Ill.) in an amount of 34% by weight; Performix E; a blend of fluid lecithin with small amounts of propylene glycol, soybean oil and ethoxylated monoglycerides (available from Archer-Daniels-Midland Company, Decatur Ill.) in an amount of 4% by weight; ethyl lactate (available from Archer-Daniels-Midland Company, Decatur Ill.) in an amount of 45% by weight; ethoxylated monoglyceride (available from BASF, Florham Park, N.J.) in an amount of 12% by weight; lecithin (Thermolec WFC, a chemically modified lecithin available from Archer-Daniels-Midland Company, Decatur Ill.) in an amount of 5% by weight.

The components were mixed and homogenized under high shear mixing for between 30 minutes and 60 minutes at ambient temperature. The microemulsion was poured into a 250 ml graduated cylinder and observed for any separation. The microemulsions were very stable over one month at room temperature. The particle size distribution and photo micrographs showed a tight distribution of particle size.

Example 13

A system for bioremediating contaminated groundwater microcosms was constructed using the following components: 160 milliliter (ml) serum bottles; 100 ml of groundwater; nominally, 1 gram of limestone; 19.54 micromoles (μmoles) perchloroethene (PCE); an excess of various electron donors were utilized; and 3 ml of inoculum containing dechlorinating bacteria known to convert PCE to ethane was used.

The inoculum was a mixed culture of halo-respiring bacteria that have been enriched to reach an optimal cell density. These mixed cultures of halo-respiring bacteria were obtained from sediment samples from rivers, streams or any waterways. In one embodiment, the inoculum originated from a Sangamon River sediment sample (Lodge Park, Piatt County, Ill.) See, e.g., Brennan, R. A., Sanford, R. A. and Werth, C. J. (2006). "Biodegradation of Tetrachloroethene by Chitin Fermentation Products in a Continuous Flow Column System." *Journal of Environ. Engr.*, June 665-673. This culture had grown for several years on PCE, anaerobic basal salts medium, Wolfe's vitamin solution and various electron donors including lactate (1-2 millimolar (mM)), formate (4 mM) and chitin using the volatile interface transfer apparatus (VITA) reactor system at the University of Illinois. Brennan, R. A., and Sanford, R. A. (2002). "Continuous steady-state method using Tenax for delivering tetrachloroethene to chlororespiring bacteria." *Appl. Environ. Microbiol.*, 68(3), 1464-1467. A microscopic direct count estimate showed that the culture's density exceeded $1 \times 10^9$ cells/ml. Using 16S rRNA gene-specific primers, *Dehalococcoides* and *Dehalobacter* spp. were detected in the inoculum. Quantitative real-time PCR was used to determine that approximately $1.65 \times 10^7$ *Dehalococcoides* gene copies were present per ml of culture.

Each bottle of the bioremediation reaction was started with a certain amount of PCE. At subsequent times, each bottle was sampled for the degradation daughter products of PCE, namely trichloroethene (TCE), cis-dichloroethene (DCE), vinyl chloride (VC) and ethene.

The dechlorination rate was determined for each bottle at each time by dividing the chloride generated by the time (days). The data was normalized to the lactate control by taking the ratio of chloride rate (μmoles/day) and the lactate control chloride rate (μmoles/day). This ratio is called relative rate and is dimensionless.

FIGS. 2-11 show the relative amount of dechlorination daughter products remaining at the last sampling point of each study. A bioremediation composition showing ethene generation at this stage was considered to have successfully demonstrated its ability to be an electron donor for the bioremediation of contaminants in water, or other sources.

Two different vegetable oil derivatives (i.e., acid-oil and soapstock) were evaluated for promoting dechlorination of PCE to ethene. Lactate (7 mM) served as a control. A total of 0.2 ml of each of the acid-oil and the soapstock was placed into triplicate 160 ml serum bottles with 100 ml of raw groundwater obtained from the Mahomet Teays middle aquifer (Glasford formation), 3 μl of residual nonaqueous phase liquid (NAPL) PCE and 2 ml of inoculum. The lactate-fed control bottles received 2 μl of PCE. The acid-oil and soapstock fed microcosms were fed more PCE to counteract potential adsorption issues. The inoculum used was from a 3 L reactor that is maintained with chitin, lactate and PCE. This inoculum is known to reduce PCE to ethene. Bottles were sampled 3-4 times over a 70 day period.

The study characterized the efficacy of acid-oil and soapstock for dechlorination of PCE to ethene, including determining the dechlorination rate at three points in time.

Figure 2:
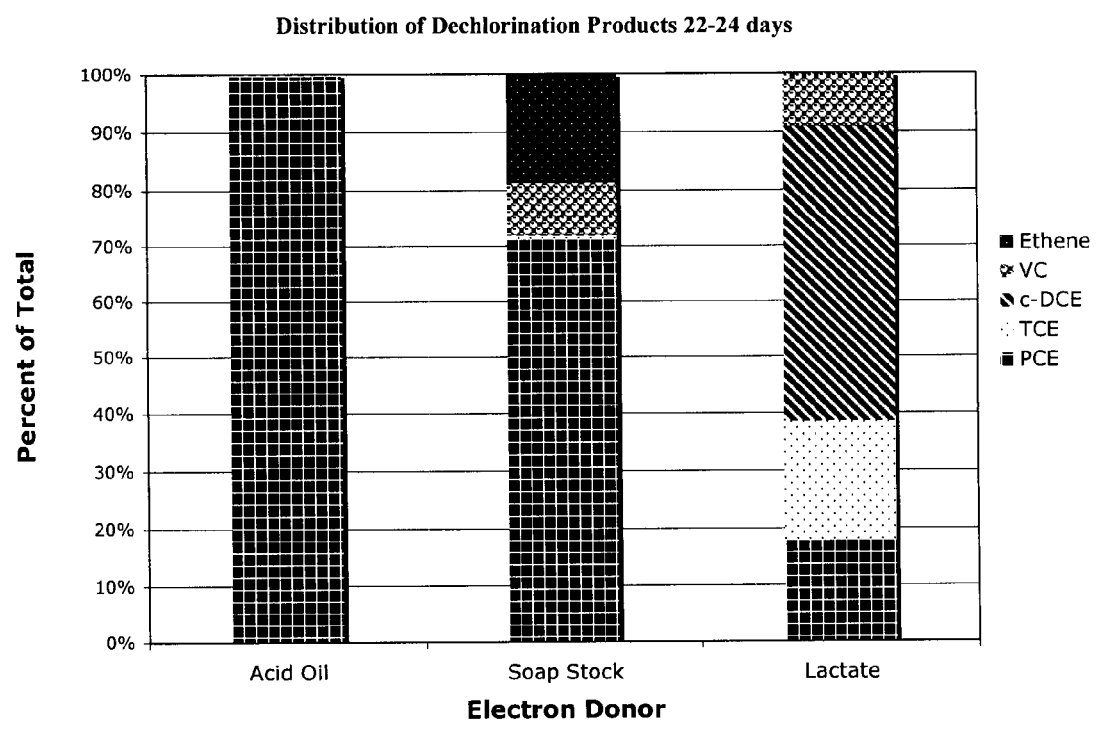
FIG. 2 is a schematic of distribution of dechlorination products at 22-24 days obtained with one embodiment of a bioremediation composition described herein.
Figure 3:
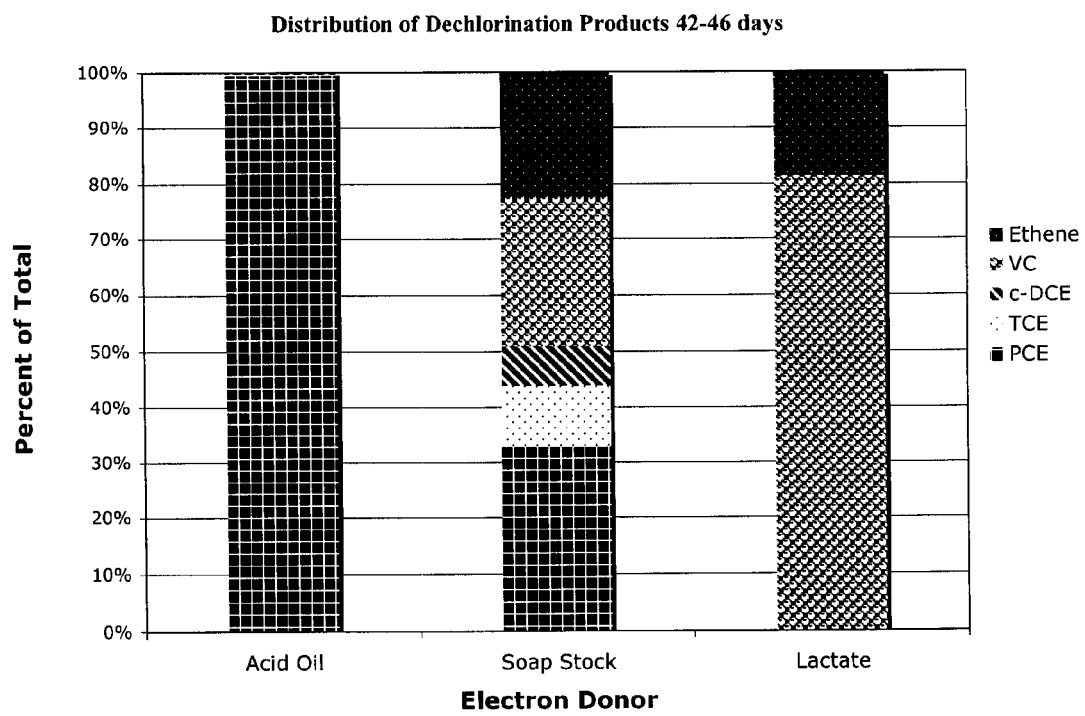
FIG. 3 is a schematic of distribution of dechlorination products at 42-46 days obtained with one embodiment of a bioremediation composition described herein.
Figure 4:
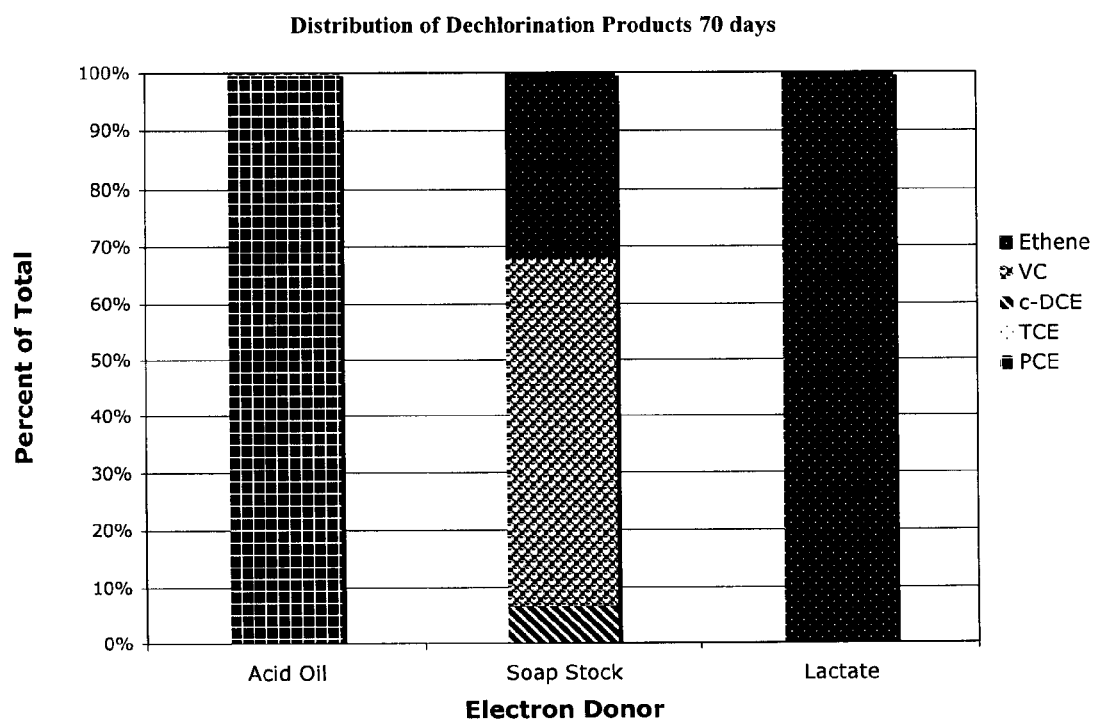
FIG. 4 is a schematic of distribution of dechlorination products at 70 days obtained with one embodiment of a bioremediation composition described herein.

FIGS. 2-4 show the relative distribution of dechlorination products after 22-24 days, 42-46 days and 70 days of incubation in microcosms fed acid-oil, soapstock or lactate.

At 22-24 days (FIG. 2), the soap stock rapidly starts dechlorinating PCE to ethene. The acid-oil shows very little dechlorination activity at 22-24 days. The lactate shows typical behavior of sequential dechlorination. The soapstock showed a different accumulation of degradation products than the lactate, with very little cis-DCE and much more ethene than the lactate.

At 42-46 days (FIG. 3), the lactate clearly shows more complete dechlorination with the only products detected being VC and ethene. The soap-stock microcosms show higher ethene proportionally, so it is possible that this product does promote more complete dechlorination, but at a slower rate as compared to lactate. The acid-oil microcosms continued to show extremely low dechlorination activity.

At 70 days (FIG. 4), the lactate control has essentially completely dechlorinated the PCE to ethene, while the soapstock bottles which contained 50% more PCE continues to dechlorinate and the acid-oil continues to have extremely low activity.

Figure 5:
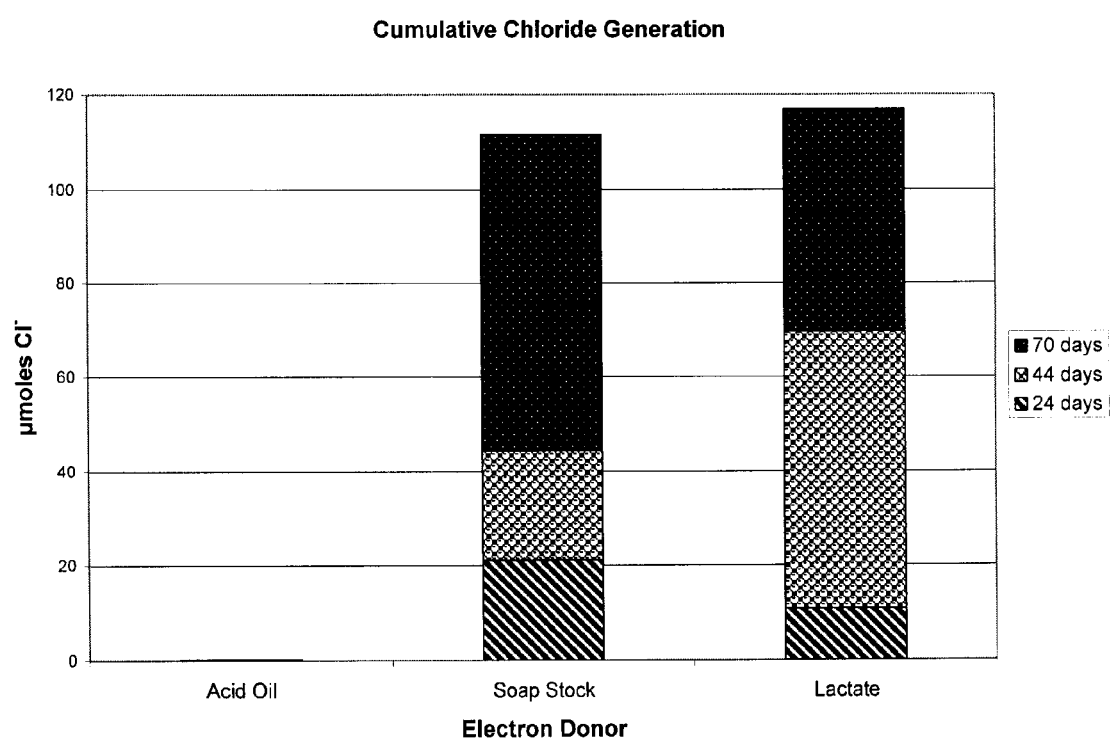
FIG. 5 is a schematic of cumulative chloride generation with different electron donors obtained with one embodiment of a bioremediation composition described herein.

FIG. 5 shows the cumulative dechlorination rates at 24 days, 44 days and 70 days. At 24 days, the soapstock dechlorination rate was faster than the lactate control, but by the 44$^{th}$ day, the lactate rate had caught and surpassed the soapstock, and by the 70$^{th}$ day the lactate rate was still slightly higher than the soapstock.

Example 14

Efficacy of various Emulsifiable Oil (EMO) formulations.

Different emulsion oil mixtures were run in microcosms and compared to lactate. The EMO formulations tested were (1000 mg/l): EMO 38 (from Example 6) (38% ethyl lactate, 42% soap stock/glycerin (80:20), 15% ethoxylated monoglyceride and 5% lecithin); EMO 44 (from Example 4) (44% ethyl lactate, 32% soap stock/glycerin (80:20), 4% polylactate, 15% ethoxylated monoglyceride and 5% lecithin); EMO 45 (from Example 3) (45% ethyl lactate, 38% soap stock/glycerin (80:20), 12% ethoxylated monoglyceride and 5% lecithin); and a lactate control (10 mM). As with Example 9, the microcosms were evaluated as compared to lactate over a 50 day period. Lactate (10 mM) was placed into triplicate 160 ml serum bottles with 100 ml of raw groundwater obtained from the Mahomet Teays middle aquifer (Glasford formation). Each bottle received 2 µl of NAPL PCE and 2 ml of inoculum. The inoculum used was from a 3 L reactor that was maintained with chitin, lactate and PCE. This inoculum is known to reduce PCE to ethene. Bottles were sampled 3 times over a 50 day period (i.e., at 22 days, 36 days and 50 days).

Three different EMO formulations were tested in microcosm to determine their efficacy as an electron donor for promoting reductive dechlorination of tetrachloroethene (PCE) to ethene. The EMO formulations tested were (1000 mg/l): EMO 38 (from Example 6) (38% ethyl lactate, 42% soap stock/glycerin (80:20), 15% ethoxylated monoglyceride and 5% lecithin); EMO 44 (from Example 4) (44% ethyl lactate, 32% soap stock/glycerin (80:20), 4% polylactate, 15% ethoxylated monoglyceride and 5% lecithin); EMO 45 (from Example 3) (45% ethyl lactate, 38% soap stock/glycerin (80:20), 12% ethoxylated monoglyceride and 5% lecithin); and a lactate control (10 mM).

Figure 6:
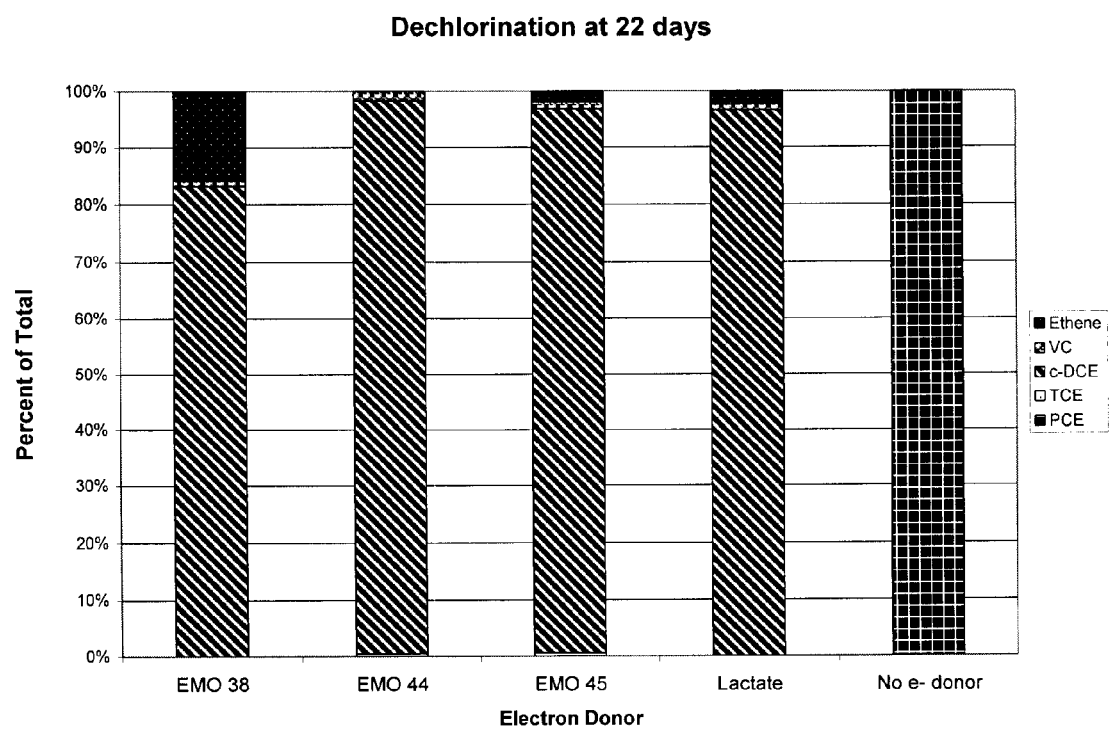
FIG. 6 is a schematic of distribution of dechlorination products at 22 days using embodiments of bioremediation compositions prepared as described herein.
Figure 7:
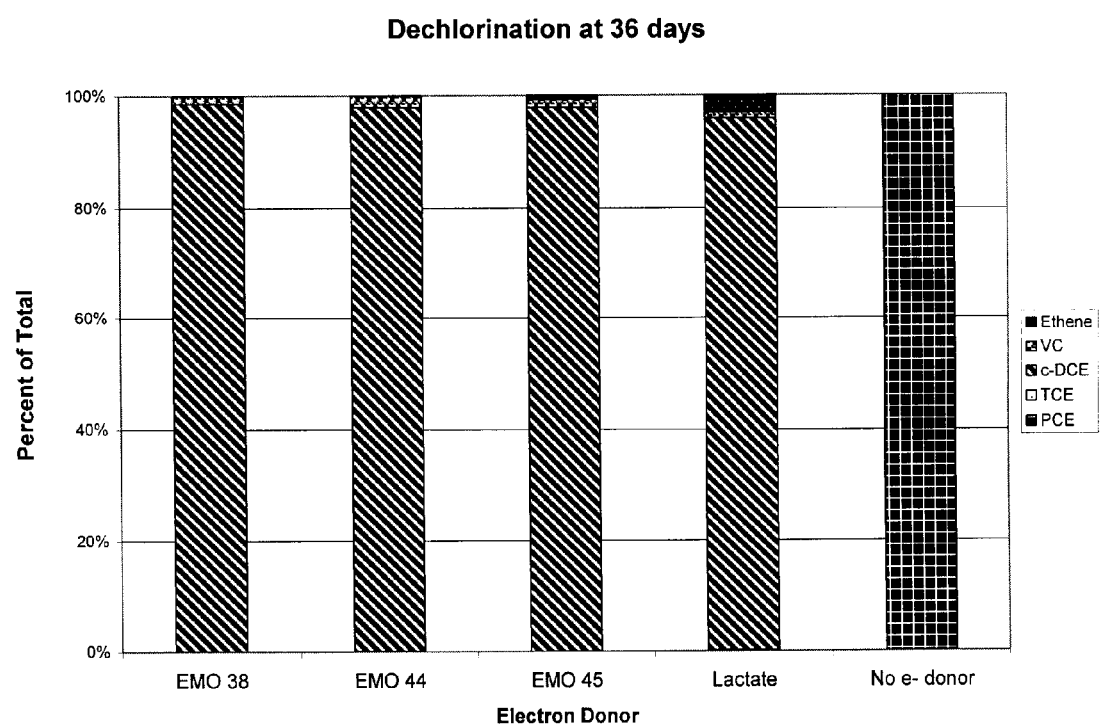
FIG. 7 is a schematic of distribution of dechlorination products at 36 days using embodiments of bioremediation compositions prepared as described herein.
Figure 8:
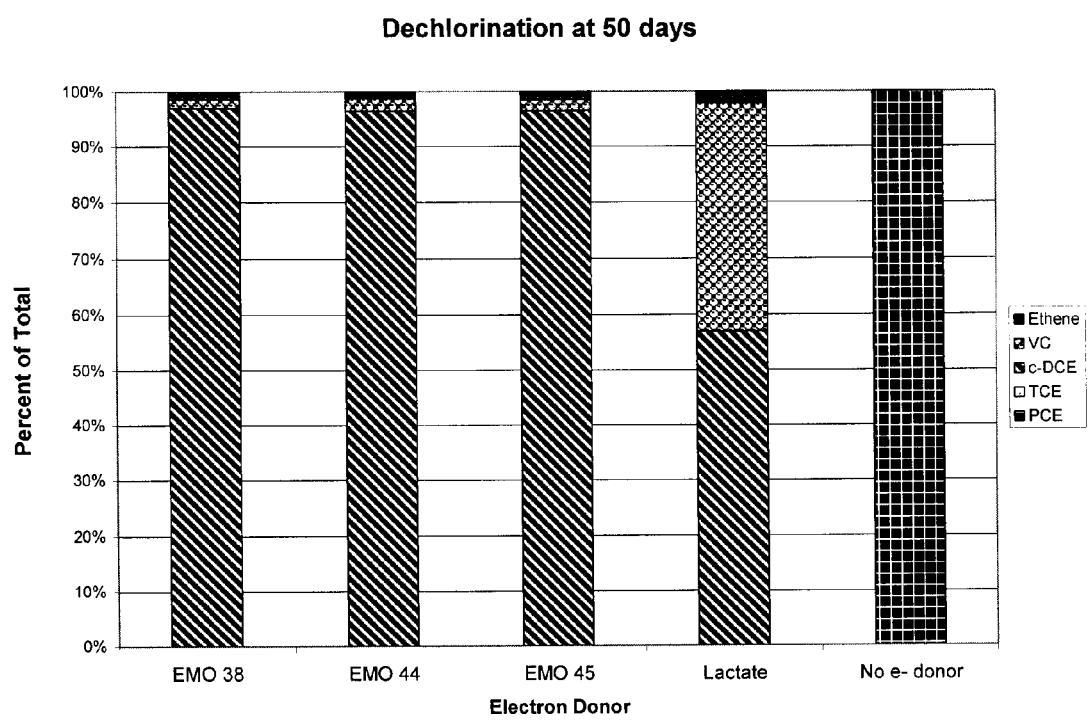
FIG. 8 is a schematic of distribution of dechlorination products at 50 days using embodiments of bioremediation compositions prepared as described herein.

FIGS. 6-8 show the relative distribution of dechlorination products at 21, 35 and 50 days. By day 22 (FIG. 6), most of the PCE and TCE was completely degraded and low to moderate levels of ethene were already being generated in all of the EMO microcosms and the lactate control. These bottles showed very little vinyl chloride (VC) accumulation.

By day 36 (FIG. 7), there was only slight increases in accumulation of VC in the three EMO microcosm with greater accumulation in the lactate control.

After 50 days (FIG. 8) of incubation in microcosms fed EMO, the lactate only microcosms were the only ones that accumulated VC, and had the highest concentrations of ethene.

Figure 9:
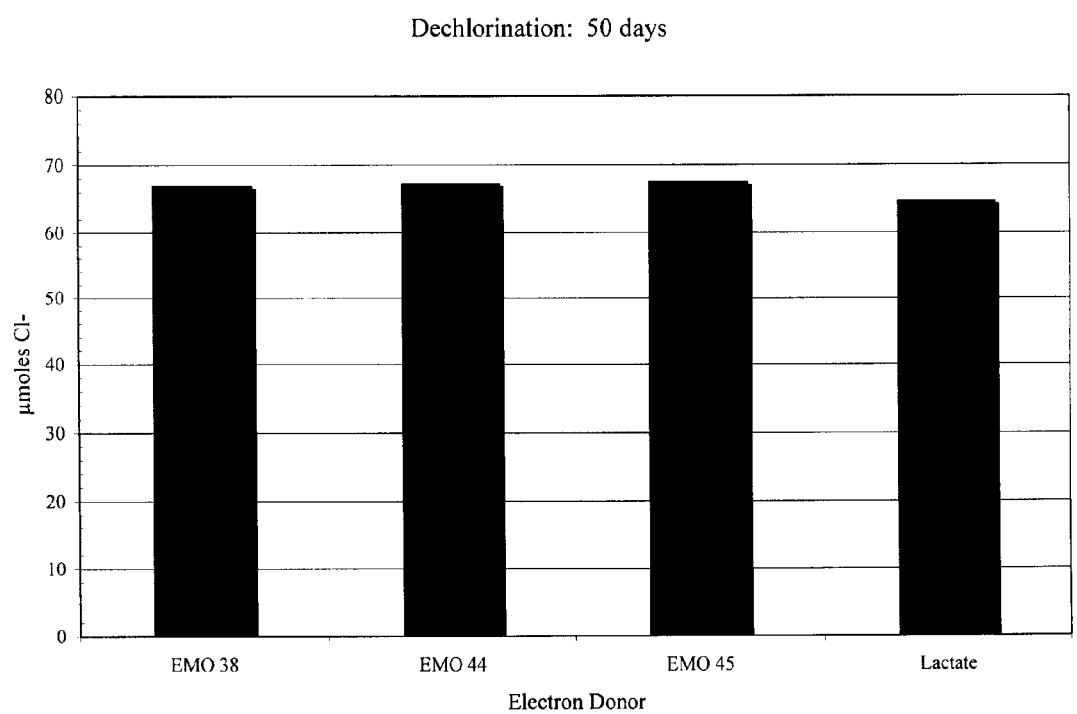
FIG. 9 is a schematic of cumulative chloride generation at 50 days using embodiments of bioremediation compositions prepared as described herein.

FIG. 9 shows the cumulative dechlorination at 50 days. Despite the higher ratio of DCE to VC in the EMO samples as compared to the lactate control, slightly greater dechlorination occurred with the EMO samples than in the lactate control. This indicates a slightly faster dechlorination rate for the EMO through 50 days as compared to the lactate.

Figure 10:
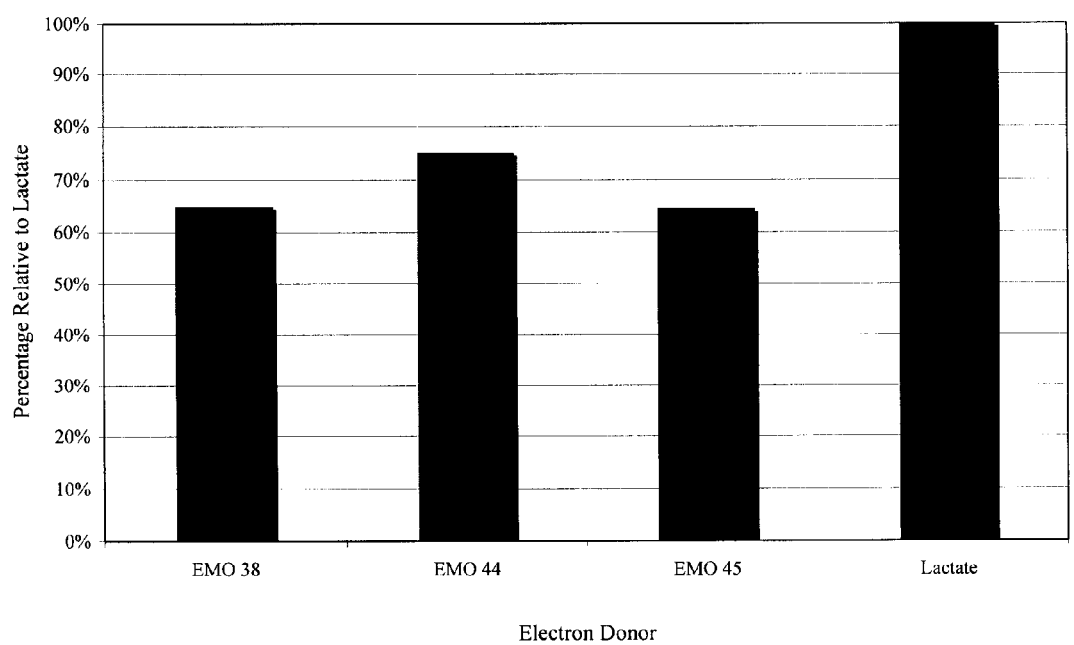
FIG. 10 is a schematic of relative dechlorination efficiency relative to lactate based on volatile fatty acids.

FIG. 10 shows the Relative Efficiency of each EMO formulation as compared to lactate based on a Volatile Fatty Acid assessment of the amount of electron donor consumed over 50 days. The different EMO Relative Efficiencies ranged from 65% to 75% of the Efficiency of the lactate control.

Figure 11:
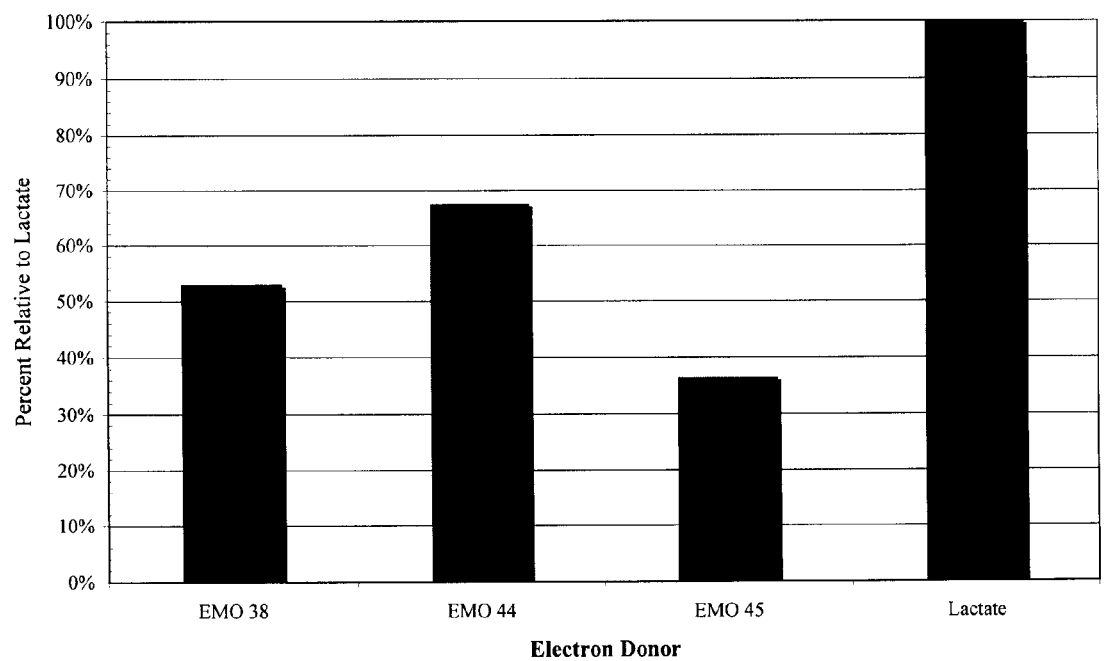
FIG. 11 is a schematic of relative efficiency of Emulsifiable Oil Substrates based on Chemical Oxygen Demand.

FIG. 11 is also an assessment of Relative Efficiency, this time using chemical oxygen demand (COD) to determine the amount of electron donor consumed over 50 days. FIG. 10 shows the same ordinal position of the EMO formulation for Relative Efficiency as FIG. 9 with EMO 44 highest, EMO 38 next and EMO 45 lowest. The Relative Efficiencies using the COD analysis gave lower efficiencies than the VFA analysis and ranged from 36% to 67%.

Figure 12:
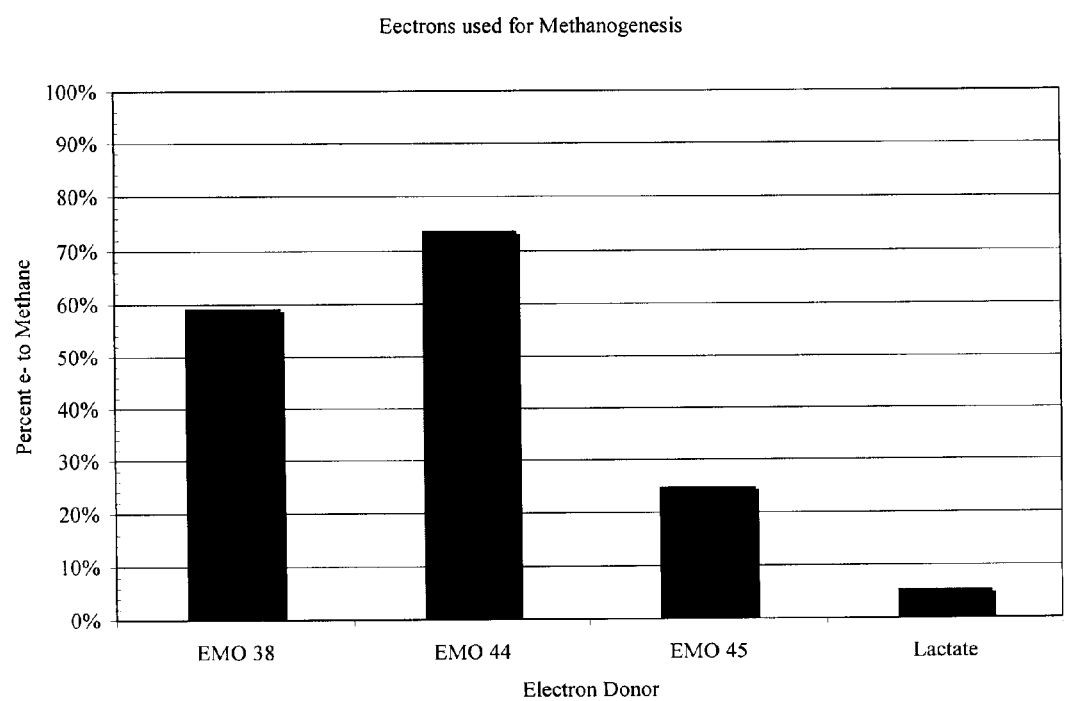
FIG. 12 is a schematic of conversion carbon donor to methane based on Emulsifiable Oil Substrate formulations.

FIG. 12 shows that all EMO formulations and the lactate control stimulated methanogenesis in all the microcosm bottles. The EMO formulation generated several times the amount of methane than the lactate control.

Example 15

Application in contaminated ground water site.

At a chlorinated hydrocarbon contaminated ground water site, a blended emulsion comprising a composition described herein is used. The emulsion is delivered as a concentrate in 55-gallon drums, is diluted 4 to 1 (water to emulsion), and is injected through 1-inch direct push wells using a manifold system. To achieve the proper blend of emulsion and water, a pre-manufactured emulsion concentrate may be used. Automatic dosing systems use water pressure from the water source to mix with the emulsion and dilution water. The desired final concentration of dilute emulsion (e.g., 1:4 to 1:20 dilutions) is adjusted by dialing in the amount of water and emulsion. These systems may install directly to any available water supply line and operate without electricity, using water pressure as the power source. The emulsion concentrate is pulled directly from the supply drum, tote, or tank and is mixed with water at the set dilution rate. The water pressure forces the diluted emulsion downstream to the injection well. The amount of emulsion concentrate is directly proportional to the volume of water entering the system, so variations in water pressure or flow rate have no effect on the dilution. Depending on the injection well layout and formation permeability, emulsion injection can require a few hours to several days per well.

Example 16

This embodiment describes a method of preparing a buffered bioremediation composition using soy soapstock.

A microemulsion concentrate was prepared by mixing: soy soapstock (available from Archer-Daniels-Midland Company, Decatur Ill.) in an amount of 38% by weight; sodium bicarbonate in an amount of 0.5-0.7% of the weight of the soapstock; ethyl lactate (available from Archer-Daniels-Midland Company, Decatur Ill.) in an amount of 45% by weight; ethoxylated monoglyceride (available from BASF, Florham Park, N.J.) in an amount of 12% by weight; and lecithin (Thermolec WFC, a chemically modified lecithin available from Archer-Daniels-Midland Company, Decatur Ill.) in an amount of 5% by weight. The pH of 100% of the produced composition and on dilution with 1% to 50% in water was near 7.0.

The compounds were mixed and homogenized under high shear mixing for between 30 minutes to 60 minutes at ambient temperature. The microemulsion was poured into a 250 ml graduated cylinder and observed for any separation. The microemulsions were stable over one month at room temperature. The particles of the microemulsion showed a narrow distribution.

As microorganism cultures may be added to the compositions of the present invention to aid in the bioremediation process and the pH where the effect of the microorganisms is maximized, addition of the buffer helps maintain the pH at which the microorganism is most effective. For instance, if a pH of 6-7 is desired, the appropriate buffer and amount of buffer may be added to maximize the function of the microorganisms at such pH. Thus, the diluted, buffered composition of the present invention will have an inbuilt buffering capability that can maximize the function of the microorganisms.

This disclosure has been described with reference to certain exemplary embodiments, compositions and uses thereof. However, it will be recognized by those of ordinary skill in the art that various substitutions, modifications or combinations of any of the exemplary embodiments may be made without departing from the spirit and scope of the disclosure. Thus, the disclosure is not limited by the description of the exemplary embodiments, but rather by the appended claims as originally filed.

What is claimed is:

1. A method for remediation of water having a contaminant, said method comprising:
    placing a composition in contact with said water, said composition comprising:
    a lipid stock selected from the group consisting of soapstock, an acid oil of soapstock, a neutralized acid oil of soapstock and any combinations thereof; and
    a compound selected from the group consisting of an emulsifier, a lactate ester, a lactate polymer, a polyhydric alcohol, carboxylic acids, salts of carboxylic acids and any combinations thereof;
    wherein said water is selected from the group consisting of ground water, waste water, storm water, run-off water, surface water and any combinations thereof.

2. The method according to claim 1, further comprising: placing a microbe in contact with the water and the composition such that the presence of the composition and the microbe results in the contaminant being converted into an innocuous derivative thereof.

3. The method according to claim 1, wherein said step of placing the composition in contact with the water comprises injecting the composition into a well in a subsurface of the ground.

4. The method according to claim 1, wherein the contaminant comprises a nonaqueous halogenated hydrocarbon.

5. The method according to claim 4, wherein the nonaqueous halogenated hydrocarbon is selected from the group consisting of a chlorinated ethane, a chlorinated ethane, a chlorinated methane, a straight-chain chlorinated hydrocarbon, a chlorinated aromatic, a halogenated organic compound, a polycyclic halogenated compound and any combinations thereof.

6. The method according to claim 1, wherein said step of placing the composition in contact with the water comprises diluting the composition in the water at a concentration of between 0.1 percent to 50 percent.

7. The method according to claim 1, wherein the composition is placed into contact with the water at a concentration of between 0.1 gallons to 10.0 gallons of the composition per cubic meter of the water.

8. The method according to claim 1, wherein said compound is an emulsifier having a hydrophile-lipophile balance range of 8-30.

9. The method according to claim 1, wherein said compound is an emulsifier selected from the group consisting of lecithins, chemically modified lecithins, enzymatically modified lecithins, sodium stearoyl lactylates, steroyl lactylic acid, sodium oleyl lactates, oleyl lactilic acid, mono- and di-glycerides, ethoxylated mono and di-glycerides, fatty amine oxides, quaternary ammonium surfactants like bile salts, betaines, sugar-derived surfactants, alkyl polyglycosides, polysorbates, polyglycerol esters, fatty alcohol ethoxylates, fatty alkanolamides, polyglycol ethers, block copolymers, vegetable oil ethoxylates, fatty acid ethoxylates, alpha olefin sulfonates, sodium lauryl sulfates, sarcosinates, sulfosuccinates, isothionates, ether sulfates and any combinations thereof.

10. The method according to claim 1, wherein the composition further comprises a buffer.

11. The method according to claim 1, wherein the lipid stock comprises salts of fatty acids, oil, glycolipids and water.

12. The method according to claim 1, wherein the composition is a microemulsion, said microemulsion comprising particles of less than 100 nm in size.

13. A method for converting a contaminant into an innocuous derivative thereof, comprising: placing a composition in contact with water having said contaminant, the composition comprising:
    a lipid stock selected from the group consisting of soapstock, an acid oil of soapstock, a neutralized acid oil of soapstock and any combinations thereof; and
    a compound selected from the group consisting of an emulsifier, a lactate ester, a lactate polymer, a polyhydric alcohol, carboxylic acids, salts of carboxylic acids and any combinations thereof;
    wherein after a period of time, at least a portion of the amount of contaminant is converted into an innocuous derivative thereof.

14. The method according to claim 13, further comprising a step of placing a microbe in contact with the water and the composition such that the presence of the composition and the microbe results in the contaminant being converted into the innocuous derivative thereof.

15. The method according to claim 13, wherein the composition further comprises a compound selected from the group consisting of sorbitan monostearate, polyoxyethylene ester of rosin, polyoxyethylene dodecyl mono ether, polyoxyethylene-polyoxypropylene block copolymer, polyoxyethylene monolaurate, polyoxyethylene monohexadecyl ether, polyoxyethylene monooleate, polyoxyethylene mono(cis-9-octadecenyl)ether, polyoxyethylene monostearate, polyoxyethylene monooctadecyl ether, polyoxyethylene dioleate, polyoxyethylene distearate, polyoxyethylene sorbitan monolaurate polyoxyethylene sorbitan monooleate, polyoxyethylene sorbitan monopalmitate, polyoxyethylene sorbitan monostearate, polyoxyethylene sorbitan trioleate, polyoxyethylene sorbitan tristearate, polyglycerol ester of oleic acid, polyoxyethylene sorbitol hexastearate, polyoxyethylene monotetradecyl ether, polyoxyethylene sorbitol hexaoleate, fatty acids, tall-oil, hexaester with sorbitol, ethoxylated castor oil, ethoxylated soybean oil, ethoxylated polyoxyethylene sorbitol tetraoleate, fatty acids, tall-oil, mixed esters with glycerol and polyethylene glycol, alcohols, C9-C16 ethoxylated derivatives of any thereof, and combinations of any thereof.

16. The method according to claim 13, wherein the composition further comprises a compound selected from the group consisting of: an electron donor comprising a salt and/or an esters of an organic acid selected from the group consisting of lactic, formic, acetic, propionic, butyric, gluconic, and glucaric; a low molecular weight water soluble polymer selected from the group consisting of polylactic acid, polyglyconic acid, polyhydroxy butyrate, sodium salt of poly acrylic acid, polyvinyl alcohol, polyethylene glycols, polyamides, and combinations of any thereof; and a biopolymer selected from the group consisting of soy protein, whey protein, chitin, cellulose, starch, xanthan gum, and combinations of any thereof.

17. The method according to claim 13, wherein the contaminant is a nonaqueous halogenated hydrocarbon.

18. The method according to claim 13, wherein said step of placing the composition in contact with the water comprises injecting the composition into a well in a subsurface of the ground.

19. The method according to claim 13, wherein said step of placing the composition in contact with the water comprises diluting the composition in the water at a concentration of between 0.1 percent to 50 percent.

20. The method according to claim 13, wherein said water is selected from the group consisting of ground water, waste water, storm water, run-off water, surface water and any combinations thereof.

21. The method according to claim 13, wherein the composition is a microemulsion, said microemulsion comprising particles of less than 100 nm in size.

* * * * *